United States Patent Office 2,884,378
Patented Apr. 28, 1959

2,884,378

REMOVAL OF UROCHROME FROM OTHERWISE POTABLE WATER BY ADSORPTION

Hans Otto Hettche, Hamburg, Germany, assignor to Forschungsgesellschaft der Wabag Wasserreinigungsbau m.b.H., Bavaria, Germany, a firm of Germany No Drawing. Application November 17, 1955
Serial No. 547,552

Claims priority, application Germany November 19, 1954

4 Claims. (Cl. 210—37)

This invention relates to water purification; and, in particular, is directed to the removal from drinking waters of urochrome and the derivatives thereof.

One of the principal hygienic demands for a drinking water is that it shall not cause disease. Since the discovery of the pathogens causing typhus, cholera, etc., various methods for the removal or the killing thereof have been described. The evaluation of drinking water for the purpose of controlling the purity thereof, always was and still is primarily, the bacillary and coli count of the water. The presence of nitrates, nitrites and ammonium salts was taken into account only to the extent that increased danger of infection by the water was due to the presence of fecal pathogens. Of all the substances dissolved in water which have harmful properties generally, the only ones which were considered are the very rarely present compounds of lead and arsenic.

My investigations have brought to light that in many regions of the earth there are present in water, sulfur-containing organic compounds which cause diseases of the thyroid in vertebrate and human beings. These compounds are known in physiology under the collective designation of urochrome or urochrome-B, and enter waters via the intestinal and bladder discharges of all vertebrates and human-beings; and they are harmful in concentrations as low as 0.5 mg. per liter. The urochrome, as is known, can be precipitated by copper salts from urine and the watery portions of the feces. Urochrome can be fractionated, into a basic component or moiety which is precipitable by copper salts, which may be designated as Bas-urochrome and an acidic component or moiety, which may be designated as Ac-urochrome. The constitution of both of these components is still unknown.

The Bas-urochrome is yellow. It slowly oxidizes in the air to form red to brown compounds. All these compounds may be precipitated by copper salts; and in the enol form thereof, all are soluble in dilute ammonia solution. They can be separated from weakly acidic solutions and flotations by amyl alcohol. They are the toxic component of the urochrome.

The Ac-urochrome remains in the aqueous phase when the substance is shaken up with amyl alcohol, and can be obtained from the dry material, remaining after removal of the water from that aqueous phase, by extraction with pyridine. The Ac-urochrome is water soluble, as is also the copper salt thereof. So far, it does not exhibit toxic effects. Particularly noticeable is the marked reduction of surface tension in aqueous solutions thereof, which may also be observed in contaminated bodies of natural water. Such a water is highly repulsive and is especially very revolting if the cause of the foaming is known. Since palatibility is a secondary consideration as compared with potability, this substance must also be removed; and this invention provides therefor.

As economically feasible methods for removing the aforesaid substances from water, the methods of precipitation and adsorption must be mentioned. The precipitation by means of metal salts without formation of corresponding metal hydroxides is not possible due to the solubility of the Bas-urochrome salts, even though the solubility is low, and the good solubility of the Ac-urochrome salts.

It was discovered unexpectedly that it was possible to remove both Bas- and Ac-urochrome by adsorption on oxides and hydroxides of earth metals and metals.

I

Adsorption on oxides

Preformed earth metal oxides such as aluminum oxide having activated surfaces are used in science and industry for about thirty years as adsorbents of higher molecular weight substances, but not in the field of water purification. In particular, the substance is used in column-like arrangements for chromatography separation.

It could not have been expected that the quantitative adsorption of smaller quantities of urochrome, about 0.3 mg. from 1 liter of water, would be possible with a column having a height of only 3 mm. and a diameter of 30 mm. Hence, this method is also suitable for the adsorption of the urochrome as well as for the determination thereof, or the determination of the Bas- and the Ac-urochrome. Ac-urochrome can be eluted by weak bases and Bas-urochrome by acids of increasing concentration, as for example, formic acid, step by step from the adsorbate. The oxide of aluminum is particularly suitable for the removal of the urochrome from water. The vessel filled therewith, which vessel should have a bottom that holds the aluminum oxide in place but is permeable to water, and the eluting material, with the water to be treated flowing from the top to the bottom. The dimensions of the vessel must be adjusted to: (a) the quantity of the flow; (b) the rate of the flow; and (c) the concentration of the urochrome in the water. For small installations, a transparent vessel is preferable since the saturation of the aluminum oxide with urochrome can be visually ascertained. Otherwise, it can be ascertained only by analysis or by the appearance of a yellow color in the filtrate when the aluminum oxide becomes markedly ineffective.

The oxide can be regenerated in the same vessel by passing an acid or alkali therethrough when the vessel is resistant to such solutions.

EXAMPLE

Well water containing 4 mg. per liter of Bas-urochrome and 2.8 mg. per liter of Ac-urochrome was passed through a cylindrical filter having a diameter of 110 mm. filled with a layer of aluminum oxide having a depth of 120 mm. at a water pressure of 1 atmosphere over pressure. There was obtained 20 liters of purified water per hour. The filter material was fully effective after a through-put of 1,000 liters of the aforesaid well water.

II

Adsorption by metal- and earth metal-hydroxides

The use of aluminum sulfate and iron chloride for water purification is known. By means of these salts, there are produced either by the bicarbonates contained in the water and/or by the addition of alkali metal or alkaline earth metal hydroxides, the hydroxides $Al(OH)_3$ and $Fe(OH)_3$, in water that is to be purified. However, the application aforesaid has been limited to turbid surface waters and waters containing colloidal suspensions, and to quantities of metal salts which generally do not exceed from 40 to 60 grams per cubic meter of water. This invention does not relate to the purification of surface waters by eliminating colloids and turbidity-causing components therefrom; but only with the removal of urochromes from water which comes directly out of the ground for drinking purposes, or those waters which have been passed through riparian or sand filters for the purpose of enriching subterranean waters, or for the purification of surface waters.

Heretofore the precipitation of copper hydroxide for the purpose of binding undesirable substances has not been used in the practice of water purification. It is particularly suitable for the removal of urochrome since only small quantities are needed so that the increase of the anions introduced into the water with such precipitation agent is small.

It has been found that the hydroxides of the earth metals, of the iron group of the periodic system of the elements, and of copper, adsorb the urochrome compounds of the water to a large extent and they can subsequently be removed by sedimentation, filtration or centrifugation. It is advisable first to add the metal salt in solution to the water and then a suitable quantity of ammonium hydroxide, alkali metal or alkaline earth hydroxide or a suitable carbonate in thorough admixture. The quantity of the hydroxide used is such that the final pH value does not exceed 7.5 as otherwise, the urochrome compound is dissolved out of the floccule. A weak acidic reaction within the pH range of 6.5 to 7.0 results in a somewhat better adsorption than within the pH range of 7.1 to 7.5. Adsorption is most effective when the adsorbent is in the free, floccular form. Hence, it is not advisable to pass water containing metal salt through $CaCO_3 \cdot MgO$. If mixtures of the aforementioned metal salts are used, such mixtures act correspondingly to that of the active individual hydroxides. The quantities of metal hydroxide which are required to purify the water from the urochrome bodies to a residue of 0.5 mg. per liter and less, for hygienic reasons, are considerably higher than the quantities customarily used for the purification of surface waters. A further difference resides in the fact that quantities of metal hydroxides required to eliminate, for example, 90% of the undesirable urochrome substances, must be relatively higher when the quantity of such undesirable substance is lower. In other words, if for a 90% removal of the undesirable urochrome substance from water containing 6 mg. of urochrome per liter of water X grams of metal hydroxide is required, then for a 90% removal of said undesirable substance, in the case of a water containing only 3 mg. of urochrome per liter, considerably more than 0.5 X grams of metal hydroxide is required.

In order to increase the efficiency and economy of the purification process, the same can be attained, if desired, when copper hydroxide is used, by converting the copper substances into metallic copper by electrolysis after the filtration thereof and subsequent dissolution in acid.

Well water, free of iron and containing 12.4 mg. of urochrome per liter is purified from urochrome with metal salt and calcium hydroxide (hydrated lime) in accordance with the data set forth in the following table which shows the amount of the salt (in mg. per liter) added to the water to produce the hydroxide floc; the pH of the water after precipitation of the floc; the amount of urochrome (in mg. per liter) present in the water after precipitation of the floc; and the percentage of the original urochrome remaining in the water after the treatment.

Addition of:

EXAMPLES

| | | | | | | |
|---|---|---|---|---|---|---|
| $Al_2(SO_4)_3$, mg./l | 273.7 | | 410.6 | | 547.4 | |
| pH after Precipitation | 7.5 | | 7.5 | | 7.5 | |
| Urochrome, mg./l | 3.01 | | 2.51 | | 2.40 | |
| Urochrome in percent | 24.3 | | 20.2 | | 19.4 | |
| $FeCl_3$, mg./l | 194.6 | | 259.5 | | 389.3 | |
| pH after Precipitation | 7.5 | 7.0 | 7.5 | 6.5 | 7.5 | 5.3 |
| Urochrome, mg./l | 3.56 | 3.48 | 3.17 | 1.95 | 1.87 | 1.08 |
| Urochrome in percent | 28.7 | 28.1 | 25.5 | 15.7 | 15.1 | 8.7 |
| $CuSO_4 \cdot 5$ aq., mg./l | 199.7 | | 299.5 | | 399.4 | |
| pH after Precipitation | 7.5 | 7.0 | 7.5 | 6.0 | 7.5 | 7.0 |
| Urochrome, mg./l | 2.03 | 1.53 | 1.53 | 1.21 | 1.11 | 0.87 |
| Urochrome in percent | 16.4 | 12.3 | 12.3 | 9.8 | 8.9 | 7.0 |

It will be understood that the foregoing description of the invention and the examples set forth are merely illustrative of the priniciples therof. Accordingly, the appended claims are to be construed as defining the invention within the full spirit and scope thereof.

I claim:

1. Process of removing urochrome from water which would be potable except for the presence therein of the urochrome, which comprises adsorbing the urochrome on at least one member of the group consisting of the oxides and hydroxides of aluminum, iron and copper, and the pH of said water containing urochrome during the adsorption stage being maintained within the approximate range of from 6.5 to 7.5.

2. Process in accordance with claim 1 wherein the adsorbent is surface activated alumina.

3. Process in accordance with claim 1 wherein the adsorbent is copper hydroxide.

4. A process in accordance with claim 1 wherein the adsorbent is a hydroxide.

References Cited in the file of this patent

UNITED STATES PATENTS

| | | |
|---|---|---|
| 145,111 | Latham | Dec. 2, 1873 |
| 622,401 | Spence | Apr. 4, 1899 |
| 1,997,302 | Koller et al. | Aug. 26, 1932 |
| 2,586,513 | Butler | Feb. 19, 1952 |
| 2,618,586 | Hendel | Nov. 18, 1952 |
| 2,751,081 | LaMotte | June 19, 1956 |
| 2,781,312 | Klumb et al. | Feb. 12, 1957 |

OTHER REFERENCES

Sewage Treatment (Imhoff and Fair), pub. by Wiley (New York), 1940, 77–81 relied upon.

Water Purification Control (Hopkins), pub. by Williams Wilkins (Baltimore), 1948, pp. 14, 15, relied upon.